(12) United States Patent
Kimmich

(10) Patent No.: US 12,042,896 B2
(45) Date of Patent: Jul. 23, 2024

(54) BORING BAR ARRANGEMENT

(71) Applicant: Hubert Kimmich, Schramberg (DE)

(72) Inventor: Hubert Kimmich, Schramberg (DE)

( * ) Notice: Subject to any disclaimer, the term of this patent is extended or adjusted under 35 U.S.C. 154(b) by 477 days.

(21) Appl. No.: 17/531,816

(22) Filed: Nov. 22, 2021

(65) Prior Publication Data

US 2022/0193841 A1 Jun. 23, 2022

(30) Foreign Application Priority Data

Dec. 22, 2020 (DE) ...................... 10 2020 134 531.3

(51) Int. Cl.
| | | |
|---|---|---|
| *B23B 29/02* | (2006.01) | |
| *B23B 29/03* | (2006.01) | |
| *B23B 31/107* | (2006.01) | |
| *B23Q 3/155* | (2006.01) | |

(52) U.S. Cl.
CPC .......... *B23Q 3/15526* (2013.01); *B23B 29/03* (2013.01); *B23B 29/02* (2013.01); *B23B 31/1075* (2013.01); *B23Q 2003/15537* (2016.11)

(58) Field of Classification Search
CPC ..... B23B 29/03; B23B 2265/12; B23B 29/04; B23B 31/11; B23B 27/007; B23B 29/027; B23B 27/16; B23B 29/02; B23B 31/1075; B23Q 3/15526; B23Q 2003/15537
See application file for complete search history.

(56) References Cited

U.S. PATENT DOCUMENTS

| | | | | |
|---|---|---|---|---|
| 1,765,362 | A * | 6/1930 | Berry | .................. B23B 31/2012 |
| | | | | 279/156 |
| 4,406,195 | A | 9/1983 | Krüger et al. | |
| 4,619,564 | A * | 10/1986 | Jacobson | ................ B23B 29/04 |
| | | | | 408/198 |
| 4,756,648 | A * | 7/1988 | Cusack | ............. B23B 29/03403 |
| | | | | 408/180 |
| 4,998,851 | A | 3/1991 | Hunt | |
| 8,327,742 | B1 * | 12/2012 | Austin | .................. B23C 5/2472 |
| | | | | 82/1.11 |
| 9,770,770 | B2 * | 9/2017 | Mada | .................. B23B 29/0341 |

(Continued)

FOREIGN PATENT DOCUMENTS

| | | |
|---|---|---|
| DE | 30 07 440 A1 | 9/1981 |
| DE | 43 40 911 A1 | 6/1994 |

(Continued)

*Primary Examiner* — Sara Addisu
(74) *Attorney, Agent, or Firm* — Norman B. Thot

(57) ABSTRACT

A boring-bar arrangement includes a boring bar, a securing device, and a clamping bolt. The securing device has a reduction sleeve, which is secured in a tool chuck, which has a front end that faces away from the tool chuck and a protruding hollow section which receives the boring bar. The hollow section has a hollow-section interior, a hollow-section outer wall, and a hollow-section wall which is arranged therebetween. The hollow-section wall has a first thickness in a side region where the cutting tool protrudes from the boring bar which is less than a second thickness in a rest of the hollow-section wall. The boring bar is releasably secured as a replaceable head, via its back end, at a front end of the protruding hollow section. A front end of the clamping bolt has a male thread which sits in the female thread of the boring bar.

15 Claims, 2 Drawing Sheets

(56) References Cited

U.S. PATENT DOCUMENTS

| | | | |
|---|---|---|---|
| 11,745,270 B2* | 9/2023 | Saffouri | B23B 27/16 |
| | | | 407/33 |
| 2010/0322722 A1* | 12/2010 | Lin | B23B 31/1075 |
| | | | 407/101 |
| 2016/0199918 A1* | 7/2016 | Langbein | B23B 27/002 |
| | | | 408/143 |
| 2016/0236282 A1* | 8/2016 | Kitagawa | B23B 27/007 |
| 2021/0039172 A1* | 2/2021 | Fu | B23Q 11/0035 |
| 2021/0354205 A1* | 11/2021 | Jensvold | B23B 29/022 |
| 2021/0379672 A1* | 12/2021 | Kimmich | B23B 31/1075 |
| 2022/0111447 A1* | 4/2022 | Hecht | B23B 27/1622 |
| 2023/0364687 A1* | 11/2023 | Volk | B23B 29/04 |

FOREIGN PATENT DOCUMENTS

| | | |
|---|---|---|
| DE | 200 10 789 U1 | 8/2000 |
| DE | 101 10 175 A1 | 9/2002 |
| WO | WO2020/011394 A1 | 1/2020 |
| WO | WO-2023037353 A1 * | 3/2023 ........... B23B 27/002 |

* cited by examiner

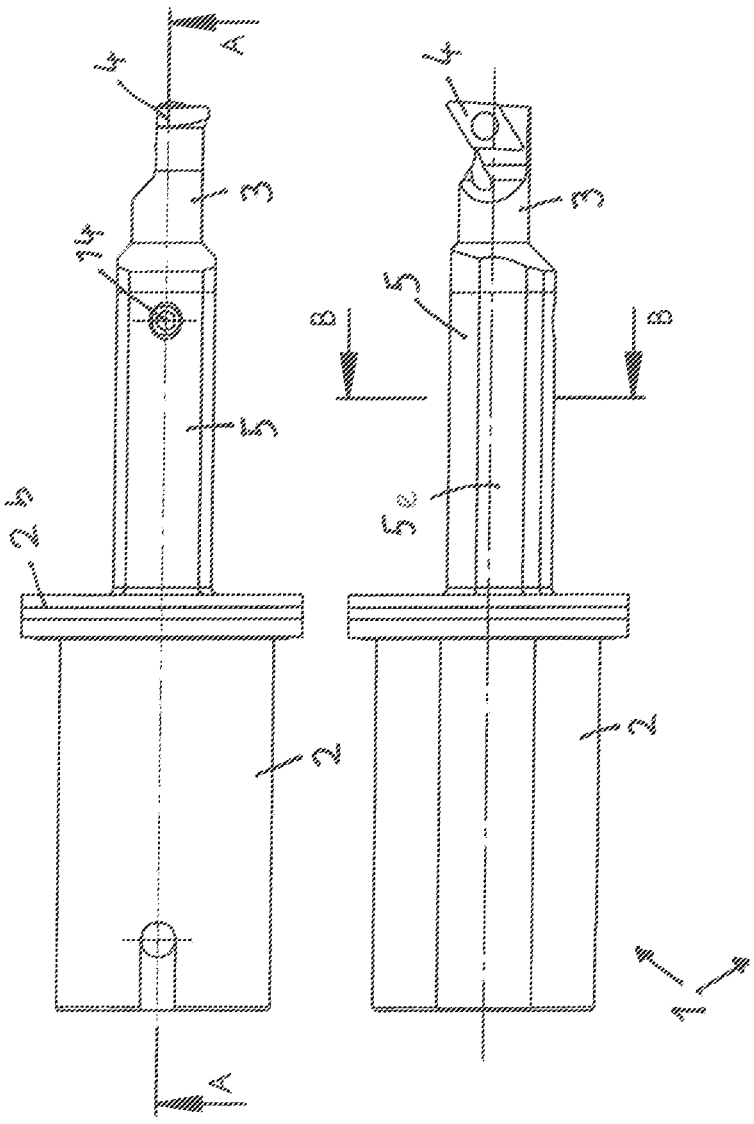
Fig. 3
Fig. 4
Fig. 5
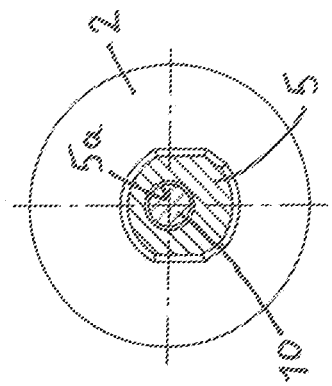
Fig. 6

BORING BAR ARRANGEMENT

CROSS REFERENCE TO PRIOR APPLICATIONS

Priority is claimed to German Patent Application No. DE 10 2020 134 531.3, filed Dec. 22, 2020. The entire disclosure of said application is incorporated by reference herein.

FIELD

The present invention relates to a boring bar arrangement with a boring bar/boring bar head and a securing device for securing the boring bar to a machine tool for machining operations, the securing device comprising a cylindrical reduction sleeve that can be secured in the tool chuck or another tool holder, the front end of which reduction sleeve, that faces away from the tool chuck, having a protruding hollow section that receives the boring bar/boring head, an end region of the boring bar/boring bar head supporting a cutting tool, the wall of the hollow section stabilizing the boring bar, between the hollow-section interior and the hollow-section outer wall, having a lesser thickness in the side region of the device in which the cutting tool protrudes from the boring bar/boring bar head than the thickness of the rest of the wall of the hollow section, the longitudinal axis of the hollow section running axially parallel to and at a distance from the common axis of the reduction sleeve or the other tool holder and of the boring bar/boring bar head.

BACKGROUND

Such a boring bar arrangement has previously been described in WO 2020/011394 A1. In this design, the boring bar runs through both the tool holder/reduction sleeve and the hollow section supporting the boring bar, and emerges at the front of the hollow section to support at its front end the cutting tool. There is a clearance between the cutting edge of the tool and the boring bar-stabilizing hollow section so that the hollow section can follow the cutting tool into the bore free of any collisions and with a high penetration depth. Through the increased stability of the boring bar and reduced vibrations, larger feeds, advances and cutting speeds can be achieved which lead to a corresponding reduction in machining time.

SUMMARY

An aspect of the present invention is to improve a boring bar arrangement of the type mentioned above so that an even higher penetration depth can be achieved with a high cutting accuracy, high stability, and low vibrations.

In an embodiment, the present invention provides a boring-bar arrangement which includes a boring bar/boring bar head, a securing device, and a clamping bolt. The boring bar/boring bar head comprises an end region which is configured to support a cutting tool, a back end which faces away from the cutting tool, and a female thread. The securing device is configured to secure the boring bar/boring bar head to a machine tool for a machining operation. The securing device comprises a cylindrical reduction sleeve which is configured to be secured in a tool chuck or in another tool holder. The cylindrical reduction sleeve comprises a front end that faces away from the tool chuck and a protruding hollow section which is configured to receive the boring bar/boring bar head. The protruding hollow section comprises a hollow-section interior, a hollow-section outer wall, a hollow-section wall which is arranged between the hollow section interior and the hollow-section outer wall, and a longitudinal axis which runs axially parallel to and at a distance from an axis of the cylindrical reduction sleeve or the another tool holder and of the boring bar/boring bar head. The hollow-section wall is configured to stabilize the boring bar/boring bar head. The hollow-section wall has a first thickness in a side region where the cutting tool protrudes from the boring bar/boring bar head and a second thickness in a rest of the hollow-section wall of the protruding hollow section, the first thickness being less than the second thickness. The boring bar/boring bar head is releasably secured as a replaceable head, via the back end, at a front end of the protruding hollow section. The clamping bolt is configured to run coaxially through the cylindrical reduction sleeve or the another tool holder and the protruding hollow section over a respective total length thereof. The clamping bolt comprises a front end which comprises a male thread which is configured to sit in the female thread of the boring bar/boring bar head.

BRIEF DESCRIPTION OF THE DRAWINGS

The present invention is described in greater detail below on the basis of embodiments and of the drawings in which:

FIG. 3 is a first side view of the boring bar arrangement (boring bar head);

FIG. 4 is a second side view of the boring bar arrangement (boring bar head);

FIG. 5 is an axial longitudinal section through the boring bar arrangement at A-A of FIG. 3; and FIG. 6 is a cross section through the boring bar arrangement at B-B of FIG. 4.

DETAILED DESCRIPTION

Figure 1:
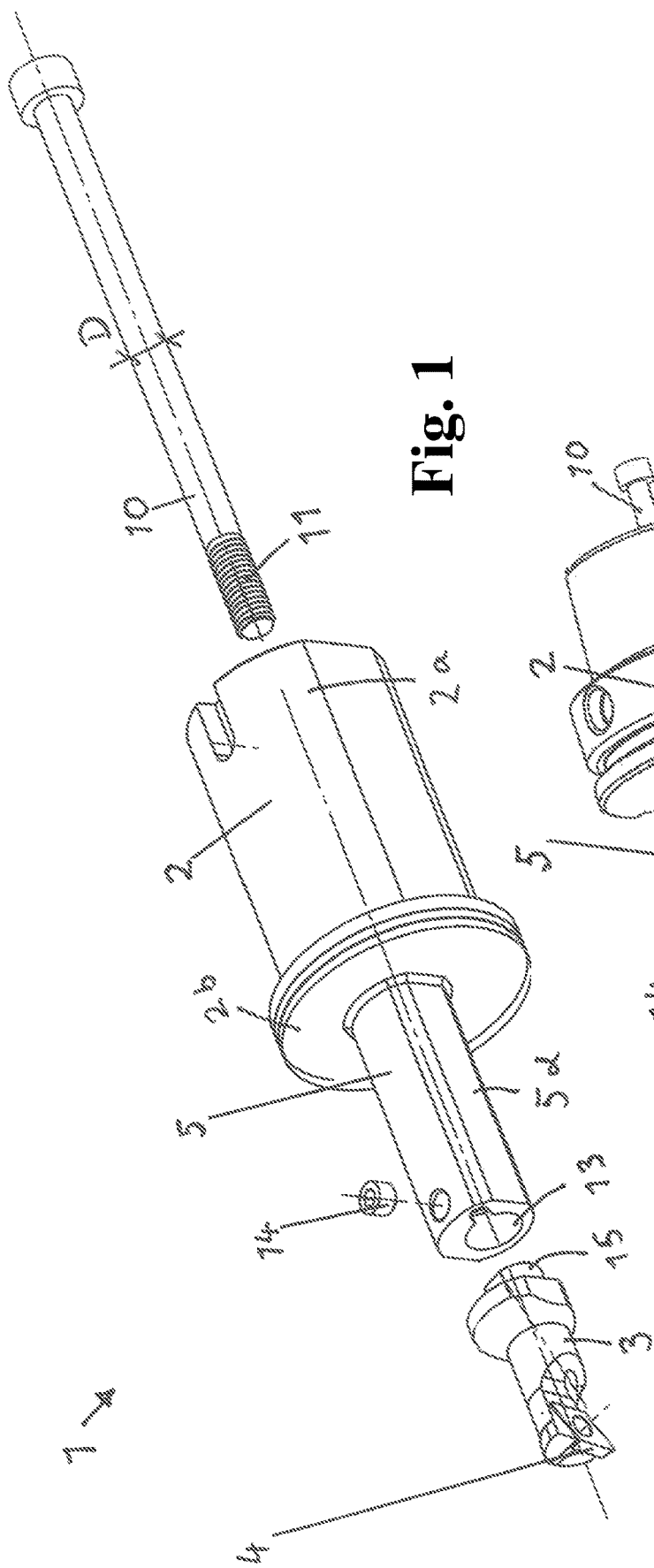
FIG. 1 is a perspective view of the boring bar arrangement with a not yet secured boring bar/boring bar head and single-piece reduction sleeve.

The present invention provides that:

The boring bar/boring bar head is releasably secured as a replaceable head with its back end, that faces away from the cutting tool, at the front end of the hollow section; and A clamping bolt runs coaxially through the reduction sleeve or the other tool holder and the hollow section over their total lengths, and the front end of the clamping bolt has a male thread sitting in the female thread of the boring bar/boring bar head.

The boring bar no longer runs through the entire length of the hollow section serving as boring bar stabilizer but, with its short length, is only secured as a replaceable head at the front end of the hollow section. A secure attachment of the short boring bar at the hollow section is achieved by the clamping bolt which runs through the hollow section and the tool holder (reduction sleeve) instead of the boring bar. This design provides even better cutting results because of the high stability and low vibrations at a high penetration depth. The boring bar as a replaceable head can be quickly and simply replaced.

The design according to the present invention also uses the advantages described from WO 2020/011394 A1 which are achieved by arranging the hollow section as the stabilizer of the boring bar not equiaxial to the axes of the tool holder and the boring bar, but with an axially parallel displacement, thereby making a penetration into tight and deep bores possible.

Two embodiments of the present invention are shown in the drawings and will be described in greater detail below under reference to the drawings.

Figure 2:
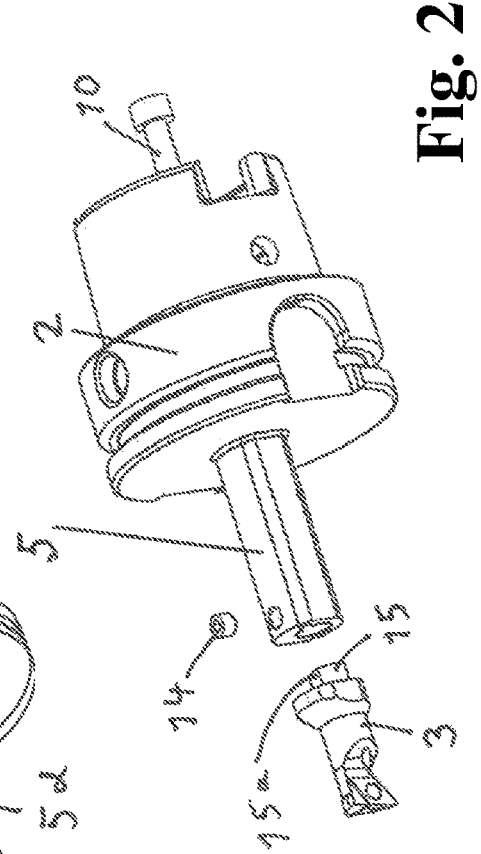
FIG. 2 is a perspective view of the boring bar arrangement with a not yet secured boring bar/boring bar head and single-piece HSK-A63 tool holder with an integrated hollow section.

The device 1 according to the present invention for securing a boring bar/boring bar head 3 to a machine tool for machining operations (the machine tool not being shown in the drawings) has a reduction sleeve (clamping sleeve) 2 or another tool holder (interface to the machine tool) such as e.g., SK, BT, CAPTO, HSK (see also FIG. 2). The reduction sleeve 2 embodiment shown in FIG. 1 has a cylindrical exterior shell 2a with which it can be secured as a tool holder in a cylindrical recess of the machine-tool chuck. At its outer end, the reduction sleeve 2 has an optional flange 2b. The reduction sleeve 2 also has an interior longitudinal recess 2c in which a clamping screw 10 (or clamping bolt) is inserted, the longitudinal recess 2c of the reduction sleeve 2 being cylindrical and having a diameter that can be up to 2 mm larger than the diameter D of the clamping screw 10 so that coolant can flow between longitudinal recess 2c and the diameter D along the side (area of the annulus) to the boring bar/boring bar head 3. The reduction sleeve (clamping sleeve) 2, the clamping screw 10 and the longitudinal recess 5a of the hollow section 5 described below have the same longitudinal axis L2.

An integral hollow section 5 which serves as a boring bar stabilizer protrudes at the front end of the reduction sleeve 2, the integral hollow section 5 having a cylindrical longitudinal recess 5a in which the clamping screw 10 is inserted so that the longitudinal recess 5a is flush with the longitudinal recess 2c of the reduction sleeve 2 and has the same longitudinal axis L2.

At the front end of the hollow section 5, a boring bar/boring bar head 3 which has a short length is releasably secured in an axially parallel orientation. The back end of the boring bar/boring bar head 3 thereby has an annular, cylindrical and flattened projection 15, which sits in a bore of the front end of the hollow section 5.

The clamping screw 10 passes coaxially through the reduction sleeve/tool holder 2 and through the hollow section 5 in an axially parallel orientation and has at its front end a male thread 11 with which it sits in a female thread 12 which is arranged at the back end of the short boring bar/boring bar head 3.

The hollow section 5 stabilizing the boring bar/boring bar head 3 covers the clamping screw 10 over the entire length of the hollow section 5, the covering wall 5d of the hollow section having, on the side and/or in the region of the device at which the cutting tool 4 protrudes from the boring bar, a lesser thickness D1 than the thickness D2 of the hollow-section wall 5b at the other sides/in the other regions. The longitudinal axis L1 of the hollow section 5 is hence parallel to and at a distance A from the longitudinal axis L2 of the cylindrical longitudinal recess 5a of the hollow section 5.

This results in a clearance between the cutting edge of the tool and the outer wall of the hollow section 5. This allows the hollow section 5, as boring bar stabilizer, to follow the cutting edge of the tool into the bore without colliding with the workpiece.

The short boring bar/boring bar head 3, which is designed as a replaceable head, is not only held at the hollow section 5 (boring bar stabilizer) by the clamping screw 10, but a locating screw 14 is additionally provided in the hollow section 5 which clamps the boring bar/boring bar head 3, in particular the cylindrical wall 15 with the flattened wall 15a, in the hollow section 5, the flattening also providing the alignment/positioning of boring bar/boring bar head 3 in relation to hollow section 5.

The cylindrical longitudinal recess 5a of the hollow section 5 has an inside diameter D3 which is the same as or is larger than the diameter of the clamping screw 10.

The female thread 12 of the boring bar/boring bar head 3 is surrounded by a cylindrical and also flattened wall 15 and 15a, which sits, in particular in positive engagement, in a bore 13 of the front end of the hollow section 5.

The axis of the cylindrical wall 15 and the axis of the boring bar/boring bar head 3 are equiaxial or spaced apart from each other in an axially parallel orientation. The axis of the boring bar/boring bar head 3 and the axis of the reduction sleeve/tool holder 2 may also be spaced apart from each other in a parallel orientation. This also increases the clearance so that the hollow section 5 can follow the cutting tool into the bore free of collisions and with a high penetration depth.

The outer wall 5c of the stabilizing hollow section 5 is cylindrical with a circular or oval cross section. The outer wall 5c of the stabilizing hollow section 5 may have a cross section with flattened regions 5e.

The hollow-section wall 5b has in the region of its lowest thickness D1 a thickness that is ½ to ¹⁄₃₀ of the thickness of the hollow-section wall in its region of this largest thickness D2.

The stabilizing hollow section 5 is integral with and protrudes from the front face of the reduction sleeve/tool holder 2. The stabilizing hollow section 5 alternatively sits, in particular longitudinally adjustably, in a longitudinal recess of the reduction sleeve/tool holder 2 and is fixed therein.

The present invention is not limited to embodiments described herein; reference should be had to the appended claims.

LIST OF REFERENCE NUMERALS

1 Device
2 Reduction sleeve/Clamping sleeve/Tool holder
2a Cylindrical exterior shell
2b Flange
2c Longitudinal recess
3 Boring bar/Boring bar head
4 Cutting tool
5 Hollow section
5a Longitudinal recess
5b Hollow-section wall
5c Outer wall
5d Covering wall
5e Flattened region
10 Clamping screw/Clamping bolt
11 Male thread
12 Female thread
13 Bore
14 Locating screw
15 Cylindrical wall
15a Flattened wall (of cylindrical wall 15)
A Distance
D Diameter
D1 First thickness of hollow-section wall 5b
D2 Second thickness of hollow-section wall 5b
D3 Inside diameter of cylindrical longitudinal recess 5a of hollow section 5
L1 Longitudinal axis (of hollow section 5)

L2 Longitudinal axis (of cylindrical longitudinal recess 5*a* of hollow section 5)

What is claimed is:

1. A boring-bar arrangement comprising:
   a boring bar/boring bar head comprising an end region which is configured to support a cutting tool, a back end which faces away from the cutting tool, and a female thread;
   a securing device which is configured to secure the boring bar/boring bar head to a machine tool for a machining operation, the securing device comprising a cylindrical reduction sleeve which is configured to be secured in a tool chuck or in another tool holder, the cylindrical reduction sleeve comprising a front end that faces away from the tool chuck and a protruding hollow section which is configured to receive the boring bar/boring bar head, the protruding hollow section comprising,
   a hollow-section interior,
   a hollow-section outer wall,
   a hollow-section wall which is arranged between the hollow section interior and the hollow-section outer wall, the hollow-section wall being configured to stabilize the boring bar/boring bar head, the hollow-section wall having a first thickness in a side region where the cutting tool protrudes from the boring bar/boring bar head and a second thickness in a rest of the hollow-section wall of the protruding hollow section, the first thickness being less than the second thickness, and
   a longitudinal axis which runs axially parallel to and at a distance from an axis of the cylindrical reduction sleeve or the another tool holder and of the boring bar/boring bar head;
   wherein,
   the boring bar/boring bar head is releasably secured as a replaceable head, via the back end, at a front end of the protruding hollow section; and
   a clamping bolt which is configured to run coaxially through the cylindrical reduction sleeve or the another tool holder and the protruding hollow section over a respective total length thereof, the clamping bolt comprising a front end which comprises a male thread which is configured to sit in the female thread of the boring bar/boring bar head.

2. The boring-bar arrangement as recited in claim 1, wherein,
   the clamping bolt further comprises a clamping bolt diameter,
   the hollow-section interior comprises a hollow section interior inside diameter, and
   the hollow section interior inside diameter is the same as or larger than the clamping bolt diameter.

3. The boring bar arrangement as recited in claim 1, wherein a length of the boring bar/boring bar head is less than a length of the protruding hollow section.

4. The boring bar arrangement as recited in claim 1, wherein the back end of the boring bar/boring bar head is clamped in the protruding hollow section.

5. The boring bar arrangement as recited in claim 4, wherein,
   the protruding hollow section further comprises a locating screw, and
   the clamping of the back end of the boring bar/boring bar head in the protruding hollow section is provided via the locating screw.

6. The boring bar arrangement as recited in claim 1, wherein,
   the front end of the protruding hollow section comprises a bore, and
   the female thread of the boring bar/boring bar head is surrounded by a cylindrical wall which sits in the bore.

7. The boring arrangement as recited in claim 6, wherein the cylindrical wall sits in a positive engagement in the bore.

8. The boring bar arrangement as recited in claim 6, wherein an axis of the cylindrical wall and an axis of the boring bar/boring bar head are equiaxial or are spaced apart from each other in an axially parallel orientation.

9. The boring bar arrangement as recited in claim 1, wherein an axis of the boring bar/boring bar head and an axis of the cylindrical reduction sleeve are spaced apart from each other in a parallel orientation.

10. The boring bar arrangement as recited in claim 1, wherein the hollow-section outer wall of the protruding hollow section is cylindrical with a circular cross section or with an oval cross section.

11. The boring bar arrangement as recited in claim 1, wherein the hollow-section outer wall of the protruding hollow section has a cross section with flattened regions.

12. The boring bar arrangement as recited in claim 1, wherein the first thickness of the hollow-section wall is ½ to ⅟₃₀ of the second thickness of the hollow-section wall.

13. The boring bar arrangement as recited in claim 1, wherein the protruding hollow section is integral with and protrudes from a front face of the cylindrical reduction sleeve or the another tool holder.

14. The boring bar arrangement as recited in claim 1, wherein,
   the cylindrical reduction sleeve comprises a longitudinal recess, and
   the protruding hollow section sits in and is fixed to the longitudinal recess of the cylindrical reduction sleeve.

15. The boring bar arrangement as recited in claim 14, wherein the protruding hollow section longitudinally adjustably sits in and is fixed to the longitudinal recess of the cylindrical reduction sleeve.

* * * * *